United States Patent [19]

Tsukahara

[11] Patent Number: 5,353,888

[45] Date of Patent: * Oct. 11, 1994

[54] BODY FRAME FOR VEHICLES

[75] Inventor: Takeshi Tsukahara, Saitama, Japan

[73] Assignee: Honda Giken Kogyo Kabushiki Kaisha, Tokyo, Japan

[*] Notice: The portion of the term of this patent subsequent to Dec. 11, 2008 has been disclaimed.

[21] Appl. No.: 668,707

[22] Filed: Nov. 6, 1984

[30] Foreign Application Priority Data

Nov. 7, 1983 [JP] Japan .................. 58-171995

[51] Int. Cl.⁵ .................. B62K 11/02; B62K 19/02; B62K 21/04
[52] U.S. Cl. .................. 180/219; 280/276; 280/279; 280/281.1
[58] Field of Search .................. 180/219; 280/274, 276, 280/279, 281 R, 289 R, 289 G

[56] References Cited

U.S. PATENT DOCUMENTS

| 4,260,170 | 4/1981 | Terai et al. | 280/276 |
| 4,280,582 | 7/1981 | Kouyama et al. | 280/281 R X |
| 4,561,670 | 12/1985 | Takada | 280/281 R |

FOREIGN PATENT DOCUMENTS

| 549883 | 8/1956 | Belgium | 280/279 |
| 0026713 | 9/1980 | European Pat. Off. | 280/281 R |
| 646745 | 6/1937 | Fed. Rep. of Germany | 280/279 |
| 945159 | 4/1949 | France | 280/281 R |
| 2480221 | 10/1981 | France | 280/281 R |

Primary Examiner—Mitchell J. Hill
Attorney, Agent, or Firm—Irving M. Weiner; Joseph P. Carrier; Pamela S. Burt

[57] ABSTRACT

A body frame (2) for a vehicle (1) of a straddle type, such as a motorcycle or a motorized tricycle, which has integrally formed, on a head tube (3) steerably suspending a front suspension (5), a reinforcement tongue (42; 142) for reinforcing the fastening between the head tube and a down tube (12) made of pipe. The reinforcement tongue is formed on a forged lower end piece (33) of the head tube and extends therefrom so as to asymptotically approach the underside surface of the down tube. The reinforcement tongue may additionally have fitted thereon a fish piece (146; 246) provided either in a pair with one at each side or as a single member, in accordance with necessary strength requirements.

3 Claims, 6 Drawing Sheets

BODY FRAME FOR VEHICLES

BACKGROUND OF THE INVENTION

1. Field of the Invention

The present invention relates generally to a body frame for vehicles. More particularly, the invention relates to a body frame for a straddle-type vehicle with a saddle seat, which includes a head tube for steerably supporting a front suspension and a substantially rearwardly extending pipe member connected at the front end thereof to the head tube.

2. Description of Relevant Art

There are many known body frames for vehicles of a type with a saddle seat to be straddled by the driver (i.e., "straddle-type vehicles"), such as a motorcycle or a motorized tricycle, which include a head tube for steerably supporting a front suspension and a pipe member connected at the front end thereof to the head tube, the pipe member extending substantially rearwardly.

Most conventional body frames such as for motorcycles and motorized tricycles include a pipe frame which is constituted as a whole so as to extend substantially in the longitudinal direction of the vehicle and has fastened at the front end thereof a head tube adapted to steerably support a front suspension of the vehicle. As a typical example, a known body frame of the so-called cradle type includes a head tube forming the front end part thereof, a rearwardly extending main tube fastened at the front end thereof to the upper part of the head tube, a rearwardly and downwardly extending down tube fastened at the upper end thereof to the lower part of the head tube, a bottom frame rearwardly extending from the lower end of the down tube, and a rear frame extending upwardly from the rear end of the bottom frame and being connected to the rear end of the main tube, and in which an engine is mounted on the bottom frame.

Such a body frame for vehicles is normally subjected, particularly in the vicinity of a head tube thereof, to relatively high loads such as due to impacts from the road, through a front fork while the vehicle is travelling. For such reasons, there are employed a number of reinforcement members such as gussets for reinforcing fastened points and the like between the head tube and a down tube as well as between the head tube and a main tube. However, the head tube, which is adapted to suspend a front wheel through the front fork, requires high accuracy in the positioning thereof and, because of its being subjected to high loads, requires a sufficient joint strength to be provided for the welding. Thus, difficult and troublesome fitting work is necessary for the provision of reinforcement members about the head tube. Further, the proportion in number of the required reinforcement members to the component parts of such a body frame for vehicles tends to give rise to a number of problems in the assembly process of the body frame.

The present invention effectively overcomes the foregoing shortcomings and disadvantages attendant a conventional body frame for vehicles.

SUMMARY OF THE INVENTION

According to the present invention, there is provided a body frame for a vehicle of a straddle-type with a front wheel and a suspension for suspending the front wheel, comprising a head tube for steerably supporting the suspension, a substantially rearwardly extending pipe member connected at the front end thereof to the head tube, and a reinforcement portion integrally formed on the head tube and adapted to reinforce the fastening of the pipe member to the head tube.

An object of the present invention is to provide a body frame for vehicles of the aforesaid type, which eliminates troublesome positioning work of reinforcement members to be provided around a head tube, while permitting not only high accuracy to be achieved with simplified assembly work, but also superior rigidity of the fastened portions, in addition to a reduction in the number of component parts.

The above and further features, objects and advantages of the present invention will become apparent from the following detailed description of preferred embodiments of the invention when the same is read in conjunction with the accompanying drawings.

DETAILED DESCRIPTION OF PREFERRED EMBODIMENTS

Figure 1:
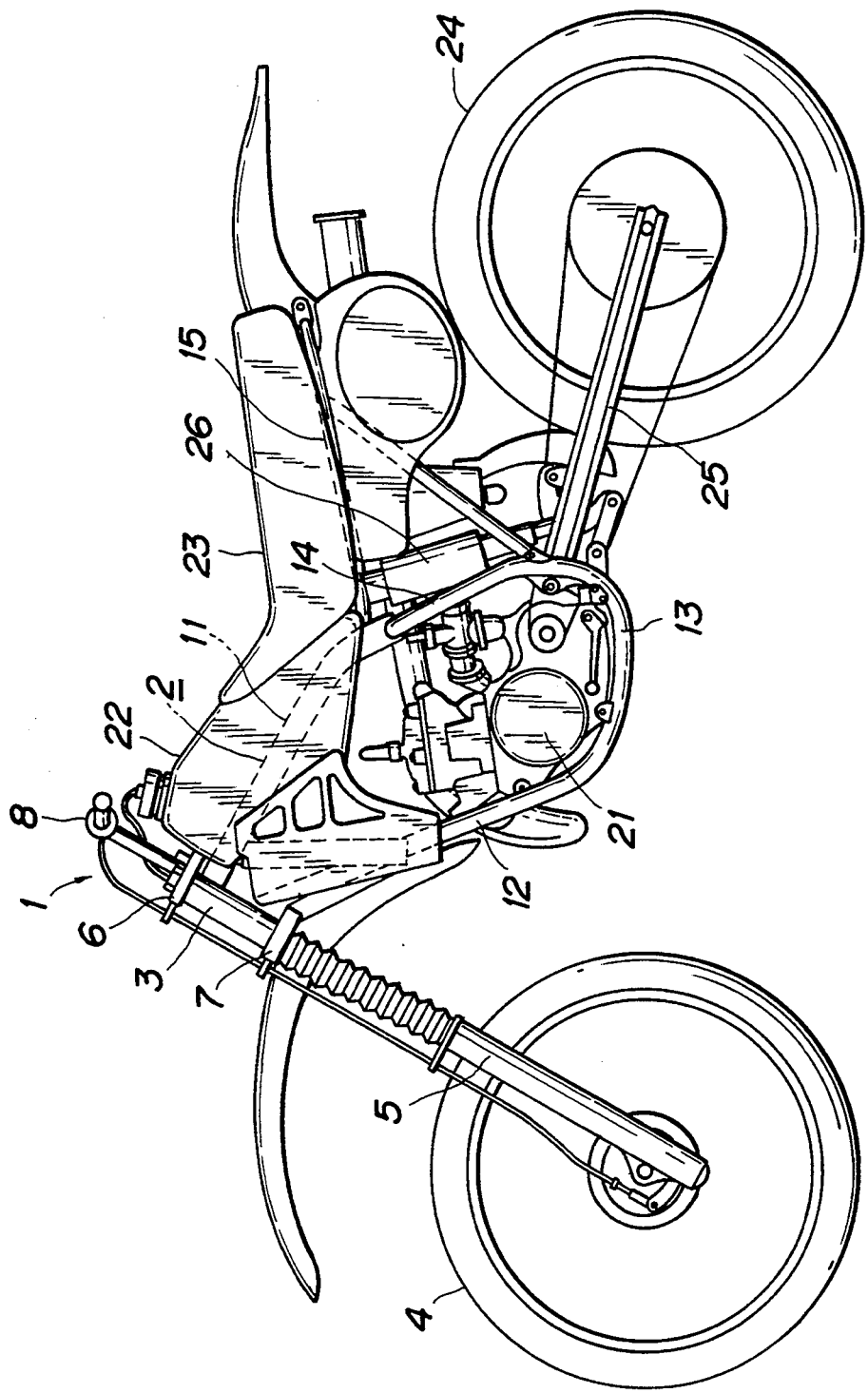
FIG. 1 is a left side view of a motorcycle equipped with a body frame according to a first embodiment of the invention.

Referring first to FIG. 1, designated at reference numeral 1 is a motorcycle in its entirety. In the motorcycle 1, a body frame 2 made of pipe members and the like has a head tube 3 disposed at the front end thereof. As a front suspension for suspending a front wheel 4, a front fork 5 is steerably supported by the combination of a top bridge 6 and a bottom bridge 7 fixed to the upper part and the lower part of the head tube 3, respectively, while the top bridge 6 has a handlebar 8 mounted thereon.

Figure 2:
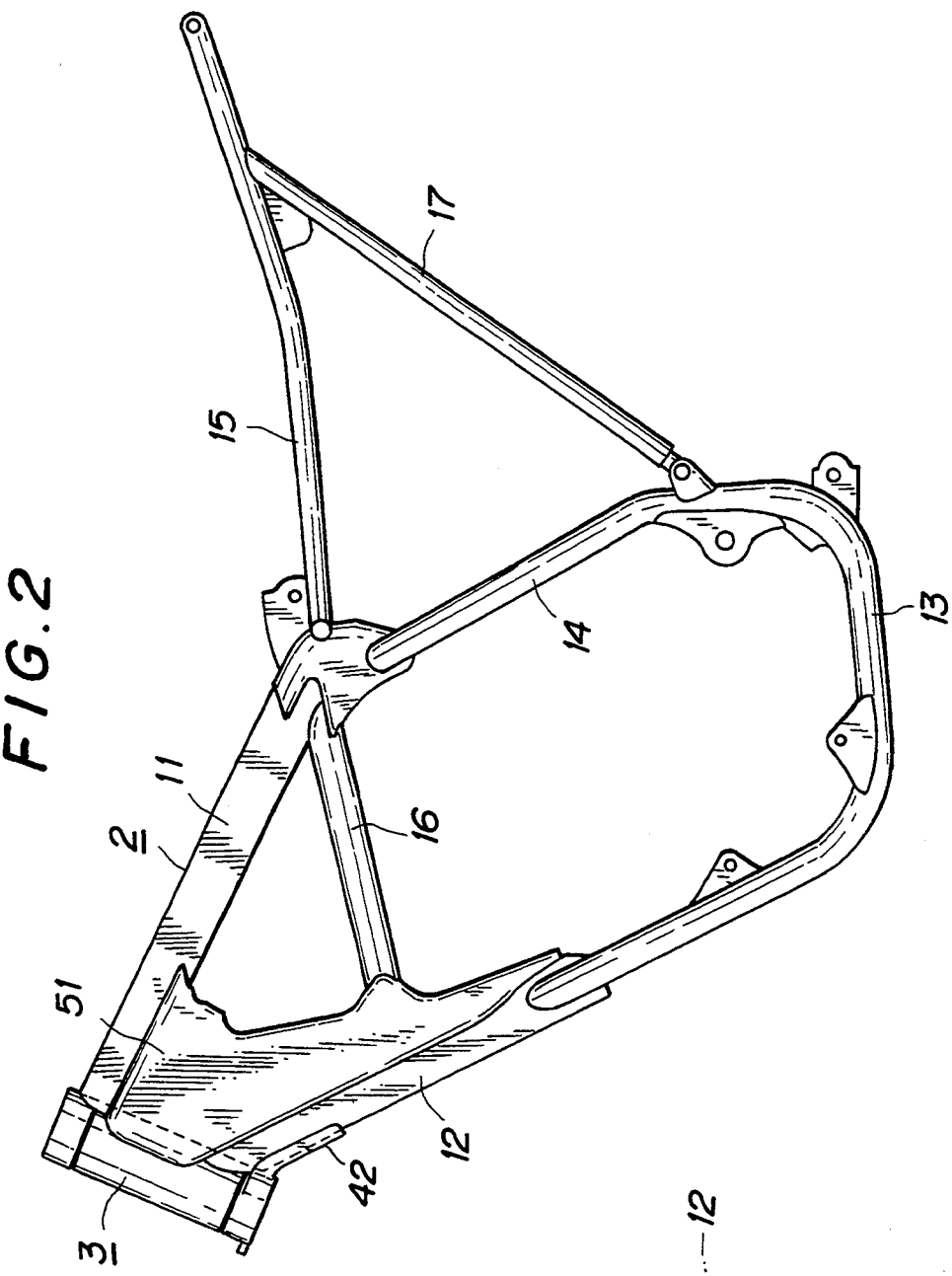
FIG. 2 is an enlarged side view of the body frame of FIG. 1.
Figure 5:
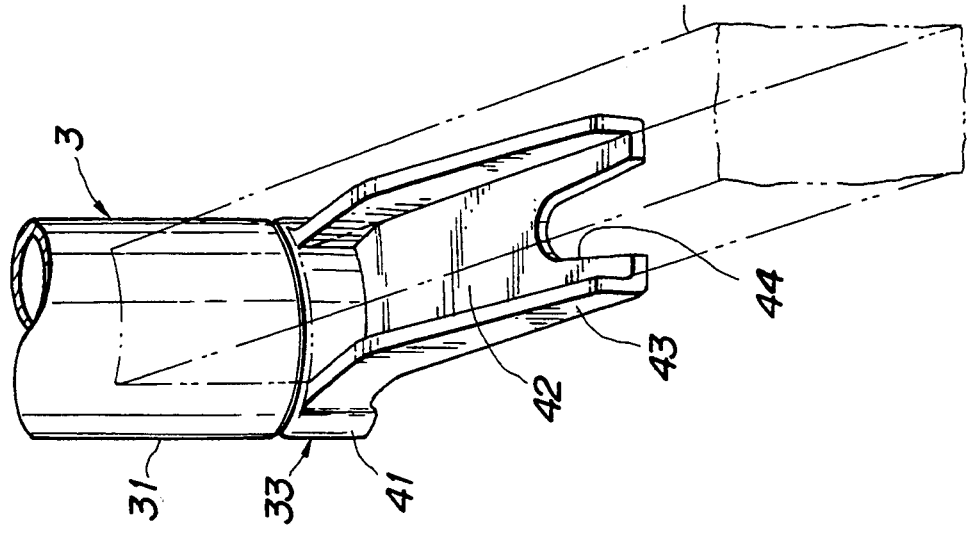
FIG. 5 is a perspective view showing a reinforcement tongue of the essential part of FIG. 4.

Referring now to FIG. 2, the body frame 2 has a main tube 11 extending rearwardly from the upper part of the head tube 3, the main tube 11 being substantially rectangular in cross section, and a down tube 12 extending rearwardly downwardly from the lower part of the head tube 3, the down tube 12 also being substantially rectangular in cross section. The body frame 2 further includes a pair of bottom frames 13 extending rearwardly from the lower end of the down tube 12, a pair of rear frames 14 extending upwardly from the rear ends of the bottom frames 13 to the rear end of the main tube 11, a pair of seat rails 15 further rearwardly extending from the rear end of the main tube 11, a cross pipe 16 for interconnecting the rear end of the main tube 11 with the middle part of the down tube 11, and a pair of rear stays 17 for connecting the lower parts of the rear frames 14 to the seat rails 15. Furthermore, the body frame 2 has a gusset 51 welded to be secured to the head tube 3, the main tube 11, and the down tube 12.

As shown in FIG. 1, the motorcycle 1 is equipped with an engine 21 installed in a space surrounded by the main tube 11, the down tube 12, the bottom frames 13, and the rear frames 14, while being further equipped with a fuel tank 22 straddling the main tube 11, a driver's seat (saddle seat) 23 mounted on the seat rails 15, and a rear suspension for vertically swingably suspending a rear wheel 24. The rear suspension includes a rear fork 25 pivotably supported at the front end thereof by the body frame 2, the rear fork 25 supporting at the rear end thereof the rear wheel 24, and a cushion unit 26 for swingably interconnecting the rear fork 25 through a progressively effecting linkage to the seat rail 15.

Figure 3:
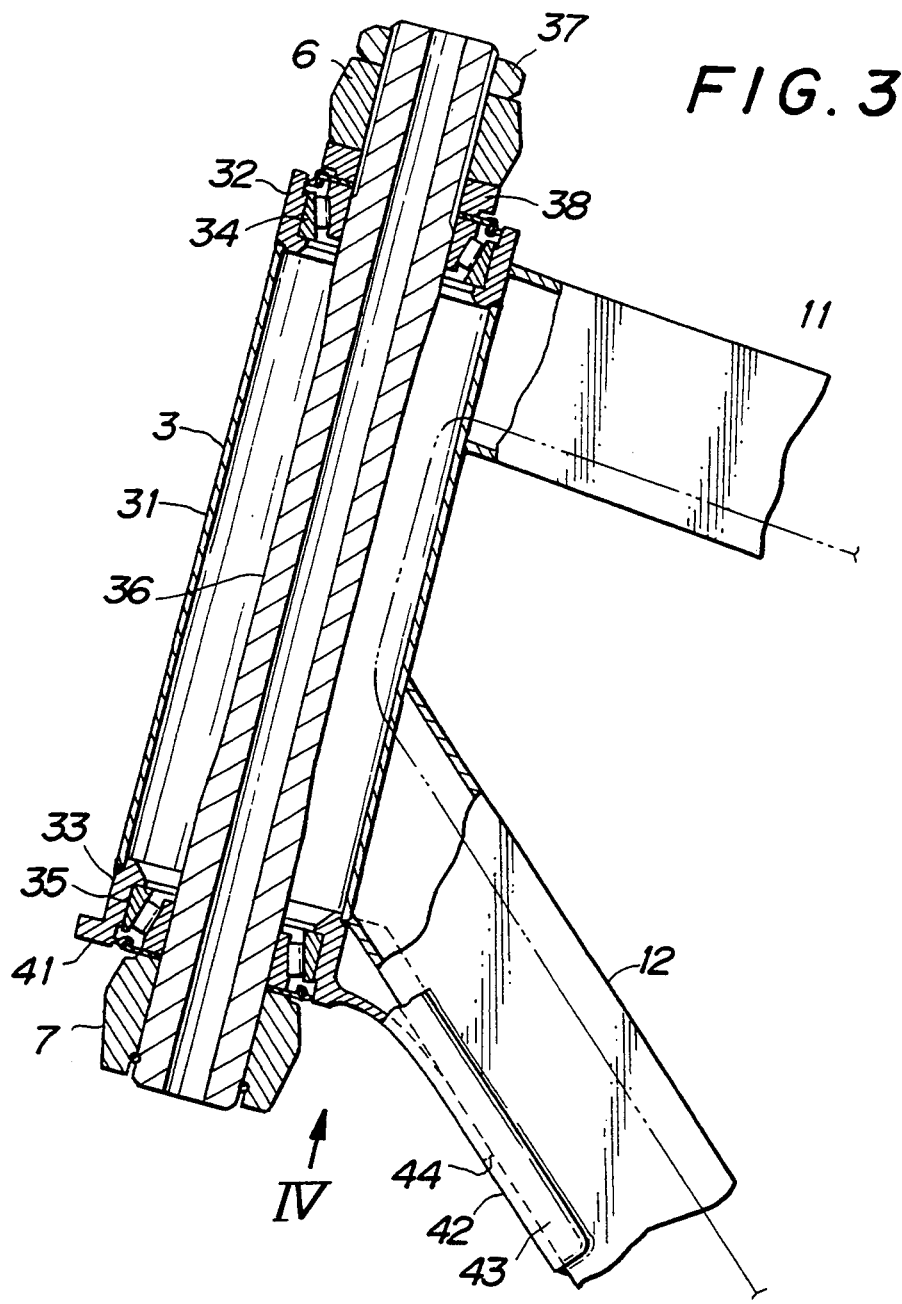
FIG. 3 is an enlarged side view, partly cut-away, of an essential part about a head tube of the body frame of FIG. 2.
Figure 4:
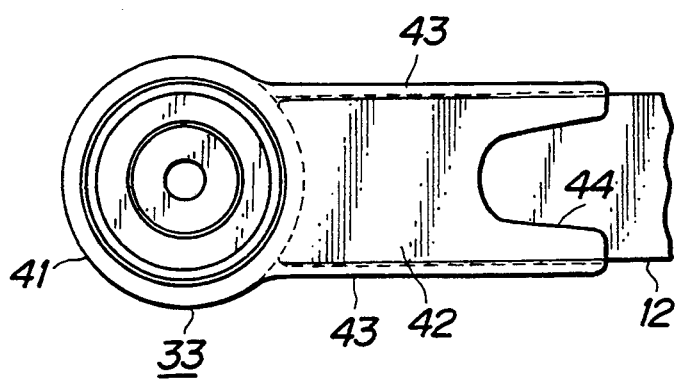
FIG. 4 is a fragmentary view of the essential part of the body frame of FIG. 3, taken in the direction of arrow IV in FIG. 3.

Referring now to FIGS. 3 and 4, the head tube 3 comprises a vertical barrel member 31 and upper and lower end pieces 32 and 33 welded to the upper and lower ends of the barrel member 31, respectively, the upper and lower end pieces 32, 33 having fitted therein upper and lower bearings 34 and 35, respectively. A steering stem 36 standing on the bottom bridge 7 is provided through the upper and lower bearings 34, 35 and tightened with a nut 38, while having above the nut 38 an upwardly projected end thereof extended through the top bridge 6 and secured thereto with a top nut 37. Thereby, the head tube 3 is permitted to steerably support the steering stem 36 in a well known manner.

The upper and lower end pieces 32, 33 of the head tube 3 are both forged items with sufficient strength. Particularly, the lower end piece 33 comprises a body portion 41 for holding therein the lower bearing 35, and a reinforcement portion or tongue 42 forming an integral part with the body portion 41 and extending rearwardly downwardly therefrom so as to asymptotically approach the underside of the down tube 12.

Welded to the head tube 3 are the front ends of the main tube 11 and the down tube 12, respectively. More particularly, the main tube 11 is welded to the upper end piece 32 and the upper part of the barrel member 31, and the down tube 12 is welded to the lower end piece 33 and the lower part of the barrel member 31.

On the other hand, the reinforcement tongue 42 integrally formed on the lower end piece 33 of the head tube 3 has on both sides thereof either of a pair of upwardly bent portions 43 welded to both side surfaces of the down tube 12. The reinforcement tongue 42 is also welded at the distal end thereof to the underside surface of the down tube 12, along an edge 44 configured substantially in a U-form to effectively lengthen the weld beam thereof.

As is apparent from the foregoing description, in the first embodiment of the invention, the head tube 3 has integrally formed therewith the reinforcement tongue 42 as a reinforcement member for reinforcing the fastening of the down tube 12 with the head tube 3, thus permitting the reinforcement tongue 42 to be formed in advance on the head tube 3 with high accuracy. Accordingly, when welding to fasten the down tube 12 to the head tube 3, there can be omitted such troublesome processes as the conventionally required positioning with high accuracy of a head tube, a down tube, and a reinforcement member, so that a body frame for vehicles can be attained with simplified welding work.

Moreover, the reinforcement tongue 42 is provided as a forged portion, which means that, by properly forming thereon a reinforcement means such as the bent portion 43, there can be obtained a reinforcement tongue with a relatively light weight and excellent rigidity. Accordingly, there can be attained a body frame for vehicles which is relatively light in weight and excellent in fastening strength between a head tube and a down tube Further, according to the first embodiment, in which the reinforcement tongue 42 is integrally formed on the head tube 3 as described hereinabove, the reinforcement of the fastening between the head tube 3 and the down tube 12 can be effected with a smaller number of reinforcement members, thus reducing the number of component parts as well as the cost.

The above-described first embodiment is directed to a body frame for vehicles, in which a distinctive reinforcing arrangement is employed for the fastening between a head tube and a down tube. In this respect, a similar reinforcement may be executed for the fastening of the head tube with a pipe frame member other than the down tube, such as a main tube.

Figure 6:
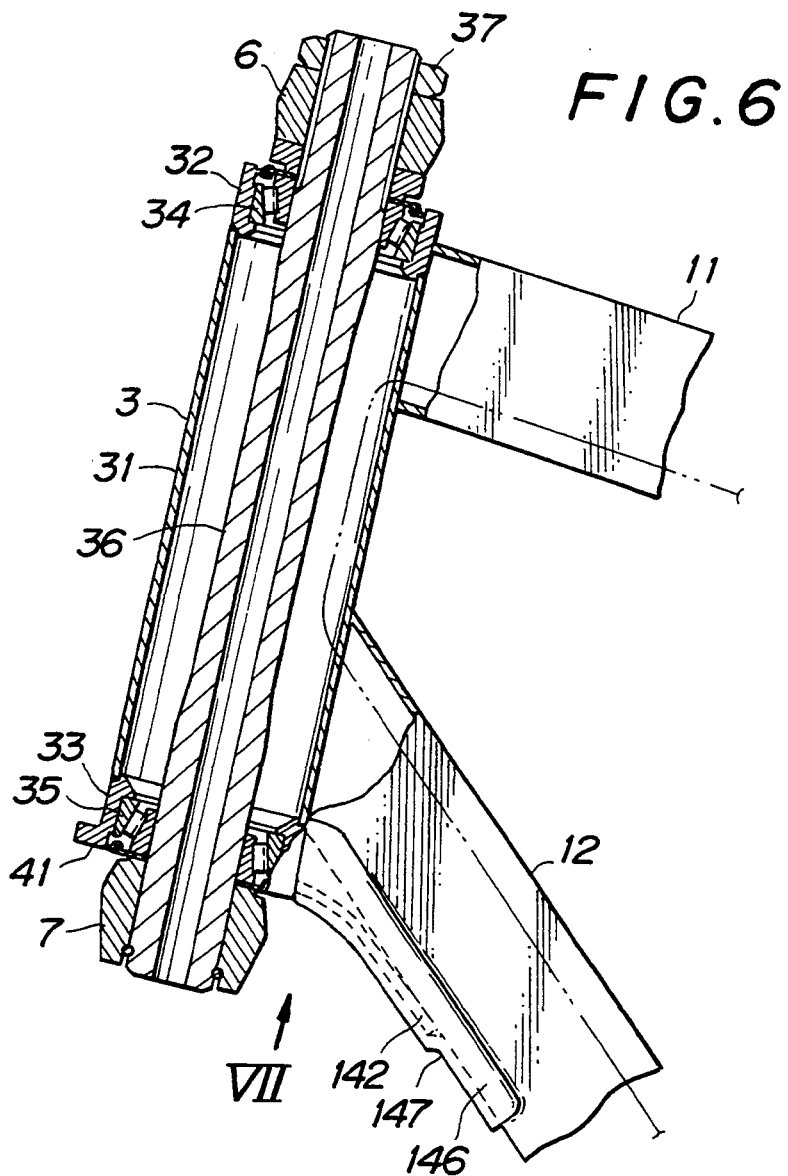
FIG. 6 is a view similar to FIG. 3, showing an essential part about a head tube of a body frame for vehicles according to a second embodiment of the invention.
Figure 7:
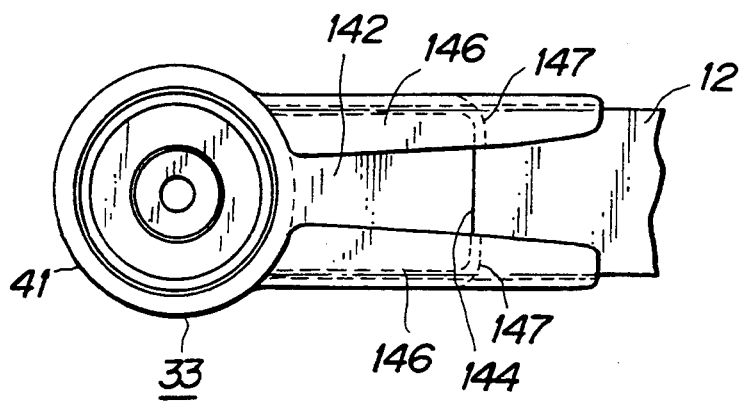
FIG. 7 is a fragmentary view of the essential part of the body frame of FIG. 6, taken in the direction of arrow VII in FIG. 6.

With reference to FIGS. 6 and 7, there will be described hereinbelow a reinforcing arrangement for the fastening between a head tube and a down tube, of a body frame for vehicles according to a second embodiment of the invention. In order to avoid duplication, like parts are designated by the same reference characters as those in the first embodiment, while any repeated description is omitted. Designated at reference numeral 142 is a reinforcement tongue integrally formed on a forged lower end piece 33 of a head tube 3 and projected therefrom so as to asymtotically approach the underside surface of a down tube 12. The reinforcement tongue 142 is configured flat along the underside surface of the down tube 12 and substantially straight along an edge 144 at the distal end thereof, and welded to be fixed to the down tube 12 along the outer edge of its contact portion with respect to the down tube 12. On the outside of the reinforcement tongue 142, there are fitted from both lateral sides thereof a pair of fish pieces 146 resembling a bamboo-sheath in form which are longer than the tongue 142. Each of the fish pieces 146 covers either lateral side part of the tongue 142 from the proximal end to the distal end thereof, while further extending beyond a stepped portion 147, axially and along the lateral side of the down tube 12, so as to be contacted with corresponding surfaces of the tube 12 and welded along the outer edge thereof to the tube 12, whereas the front edge thereof is contacted to be welded to the head tube 3.

According to the second embodiment of the invention, the reinforcement of the fastening between the head tube 3 and the down tube 12 can be effected even more completely than in the first embodiment, while minimizing the positioning labor.

Incidentally, a reinforcing arrangement as described above is not limited to the fastening between a head tube and a down tube, but is also applicable to the fastening of the head tube with another frame member, for example with a main tube.

Figure 8:
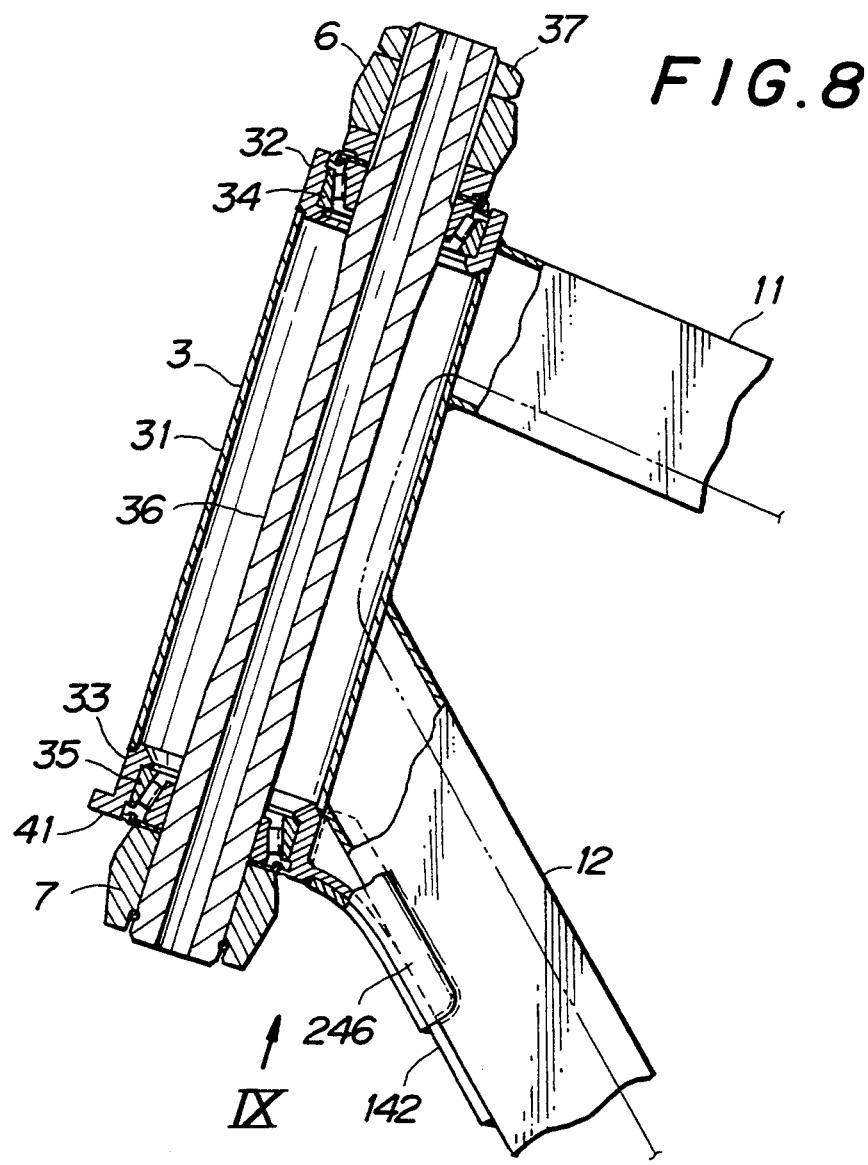
FIG. 8 is a view similar to FIG. 3, showing an essential part about a head tube of a body frame for vehicles as a modified example of the second embodiment of the invention.
Figure 9:
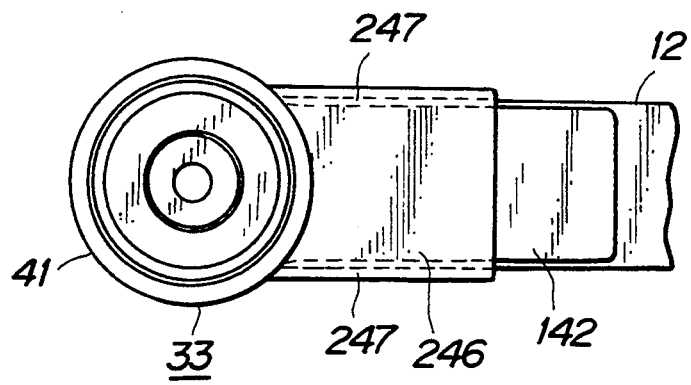
FIG. 9 is a fragmentary view of the essential part of the body frame of FIG. 8, taken in the direction of arrow IX in FIG. 8.

There will be described hereinbelow a body frame for vehicles as a modified example of the second embodiment of the invention, with reference to FIGS. 8 and 9, in which, in order to avoid duplication, like parts are designated by the same reference characters as those in the second embodiment, while omitting any repeated description. Designated at reference numeral 246 is a fish piece fitted to cover from outside on a reinforcement tongue 142 which is integrally formed on a forged lower end piece 33 of a head tube 3 and projected therefrom so as to asymtotically approach the underside surface of a down tube 12. The fish piece 246, though being flat like the tongue 142 and shorter than same, has a larger width than the tongue 142 and is bent upwardly at both lateral sides thereof so as to extend, beyond a stepped portion 247 accommodating therein the side edge of the tongue 142, along the lateral sides of the down tube 12. There is thus formed a channel-like member to be welded to the down tube 12, and the piece 246 is further welded at the front edge thereof to the head tube 3 and at the rear edge thereof to a middle part of the tongue 142.

According to the modified example of the second embodiment of the invention, there is attained an increased reinforcement strength as well as a reduction in the number of component parts, and a variety of other advantages as in the second embodiment are also provided.

Although the foregoing embodiments are all directed to a motorcycle, the present invention is also applicable to various other straddle-type vehicles, including motorized tricycles.

Figure 10:
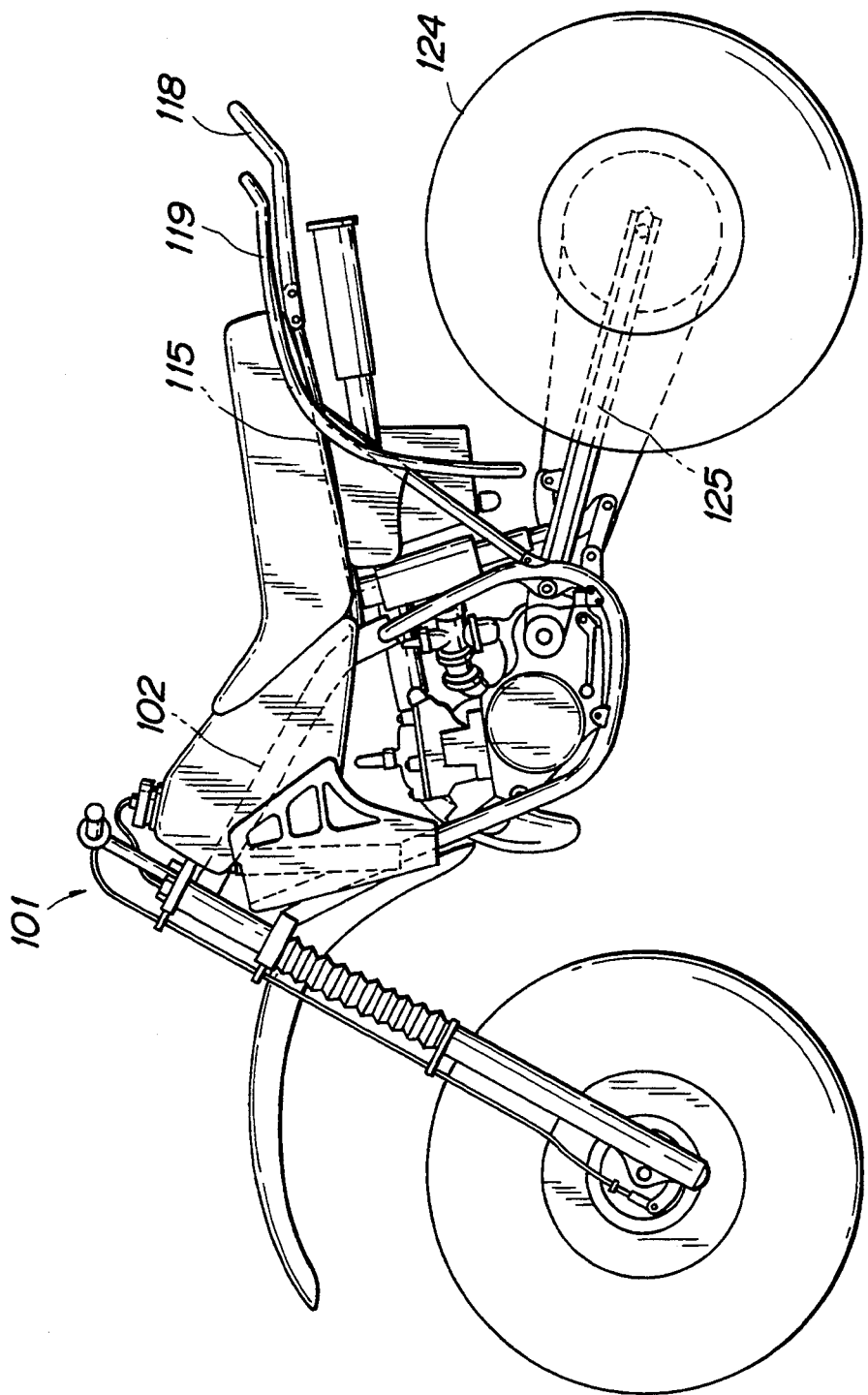
FIG. 10 is a side view of a motorized tricycle having a body frame according to the invention.

Referring now to FIG. 10, designated at reference numeral 101 is a motorized tricycle. The tricycle 101 has a body frame 102 which is substantially the same as the body frame 2 of FIG. 2 in the first embodiment of the invention and may be similar to the second embodiment and the modified example thereof, except for minor differences of vehicle constitution in comparison with the motorcycle 1 of FIG. 1. In this respect, in the tricycle 101, a rear suspension including a rear fork 125 is arranged between a pair of rear wheels 124 in the form of a pair of ultra-low pressure balloon tires. Also, a carry pipe 118 is attached to the rear end of seat rails 115, and a pair of rear fenders 119 are provided on outer sides of the seat rails 115.

Incidentally, although the foregoing embodiments are described with respect to the fastening between a head tube and a down tube substantially rectangular in cross section, the present invention is also applicable to a down tube with a substantially circular cross section, by employing a reinforcement tongue with a trough-like configuration for mating with the outer circumference of the down tube and by providing, when necessary, a fish piece with a similar configuration. In this manner, various advantages similar to those of the above-described embodiments can be attained.

As will be apparent from the foregoing description, according to the invention there is provided a body frame for vehicles which eliminates the troublesome positioning work of reinforcement members to be provided around a head tube, while permitting not only high accuracy to be achieved with facilitated assembly work, but also excellent rigidity of the fastened portions, in addition to a reduction in the number of component parts.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

I claim:

1. A body frame for a vehicle of a straddle type having a front wheel and a suspension for suspending said front wheel, comprising:
   a head tube for steerably supporting said suspension;
   a substantially rearwardly extending pipe member connected at the front end thereof to said head tube; and
   a reinforcement portion integrally formed on said head tube and adapted for reinforcing the fastening of said pipe member to said head tube;
   said reinforcement portion and a part of said head tube being a unitary forged member;
   said reinforcement portion being welded to said pipe member;
   said reinforcement portion comprising a tongue portion extending rearwardly so as to asymptotically approach, to be contacted with, said pipe member;
   said tongue portion being adapted to mate with the underside surface of said pipe member;
   said vehicle being equipped with an engine;
   said pipe member being adapted to bear the weight of said engine;
   said pipe member is substantially rectangular in cross section;
   said tongue portion is substantially flat and has a distal end edge formed substantially straight;
   said tongue portion has a fish piece fitted thereon from outside; and
   said fish piece is welded to said pipe member and said tongue portion.

2. A body frame according to claim 1, wherein:
   said fish piece is configured substantially in the form of a bamboo sheath (146), longer than said tongue portion; and
   a pair of said fish pieces is provided, one on each lateral side of said tongue portion.

3. A body frame according to claim 1, wherein:
   said fish piece is shorter than said tongue portion and configured substantially in the form of a channel (246).

* * * * *

UNITED STATES PATENT AND TRADEMARK OFFICE
CERTIFICATE OF CORRECTION

PATENT NO. : 5,353,888
DATED : October 11, 1994
INVENTOR(S) : Tsukahara

It is certified that error appears in the above-indentified patent and that said Letters Patent is hereby corrected as shown below:

Column 6, line 30 (claim 1, line 12), after "unitary" insert a comma;

Signed and Sealed this

Twenty-seventh Day of December, 1994

Attest:

BRUCE LEHMAN

*Attesting Officer*  *Commissioner of Patents and Trademarks*